(12) United States Patent
Flieh et al.

(10) Patent No.: US 11,541,757 B1
(45) Date of Patent: Jan. 3, 2023

(54) METHOD AND APPARATUS FOR DIAGNOSING MOTOR PHASE CONNECTIONS

(71) Applicant: Rivian IP Holdings, LLC, Plymouth, MI (US)

(72) Inventors: Huthaifa Mohammad Mahmoud Flieh, Torrance, CA (US); Chia-Chou Yeh, Torrance, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 16 days.

(21) Appl. No.: 17/348,419

(22) Filed: Jun. 15, 2021

(51) Int. Cl.
*B60L 3/00* (2019.01)
*H02P 1/16* (2006.01)

(52) U.S. Cl.
CPC .............. *B60L 3/0061* (2013.01); *H02P 1/16* (2013.01)

(58) Field of Classification Search
CPC .... H02P 29/0243; H02P 29/00; H02P 29/024; H02P 29/0241; H02P 29/025; H02P 29/026; H02P 29/027; H02P 29/032; H02P 29/028; H02P 29/40; H02P 31/00; H02P 27/00; H02P 27/04; H02P 27/06; H02P 27/08; H02P 27/085; H02P 21/00; H02P 21/22; H02P 21/14; H02P 21/34; H02P 23/00; H02P 23/07; H02P 23/14; H02P 25/00; H02P 25/022; H02P 25/062; H02P 25/064; H02P 25/16; H02P 3/00; H02P 3/08; H02P 1/00; H02P 1/04; H02P 1/24; H02P 1/26; H02P 1/42; H02P 1/46; H02P 6/00; H02P 6/12; H02P 6/28
See application file for complete search history.

(56) References Cited

U.S. PATENT DOCUMENTS

2022/0158572 A1* 5/2022 Sun ................. H02P 29/024

OTHER PUBLICATIONS

Cheng et al., "An open-circuit fault-diagnosis method for inverters based on phase current," *Transportation Safety and Environment*, vol. 2(2), pp. 148-160 (2020).
Sobański et al., "Detection of single and multiple IGBTs open-circuit faults in a field-oriented controlled induction motor drive," *Archives of Electrical Engineering*, vol. 66(1), pp. 88-104 (2017).

* cited by examiner

*Primary Examiner* — Antony M Paul
(74) *Attorney, Agent, or Firm* — Haley Guiliano LLP

(57) ABSTRACT

Testing connections to phase windings of an electric motor upon startup includes, prior to entering a RUN state in which motor power commands are accepted from a user to perform work, applying to each respective phase of the electric motor a respective test voltage signal, measuring in each respective phase a respective current induced by the respective test voltage signal, and preventing entry into the RUN state when at least one values representative of a respective current is below the respective predetermined threshold.

20 Claims, 5 Drawing Sheets

METHOD AND APPARATUS FOR DIAGNOSING MOTOR PHASE CONNECTIONS

INTRODUCTION

This disclosure relates to a method and apparatus for diagnosing motor phase connections. More particularly, this disclosure relates to diagnosing motor phase connections between an inverter and an electric motor in a motorized device—e.g., an electric traction motor in an electric vehicle—without risk of damaging systems in the device and without interfering with device operation.

Faults can occur in power electronics of an electric motor, or in the motor itself, between uses. For example, taking an electric vehicle as just one example of a motorized device, traction motors in electric vehicles may be AC-series electric motors having multiple phase windings (e.g., three phases). The temperature of electrical components in an electric vehicle can vary during use, and further between uses, particularly if the vehicle is parked outdoors and the sun load changes. Resulting thermal stresses can lead to a fault in a motor phase—either in a phase winding itself, or in corresponding electronics or related connectors. Motor phase faults may arise from other causes as well. Attempting to operate an electric motor with a faulty motor phase can cause additional damage to the electric motor, the power electronics, or other components of the vehicle drivetrain. Similar concerns may arise with other types of motorized devices that use an electric motor to perform work (e.g., to operate a tool).

SUMMARY

A method according to implementations of the subject matter of this disclosure, for testing phases (i.e., phase windings, connections to phase windings, or related circuitry) of an electric motor, includes, prior to entering a RUN state, applying to each respective phase of the electric motor a respective test voltage signal, each respective test voltage signal having parameters selected to avoid causing the electric motor to rotate, measuring in each respective phase a respective current induced by the respective test voltage signal, and preventing entry into the RUN state when at least one value representative of a respective current is below the respective predetermined threshold.

A first implementation of such a method further includes allowing entry into the RUN state when values representative of all respective currents are above respective predetermined thresholds.

According to a second implementation of such a method, the parameters of each respective test voltage signal may include (a) a magnitude between 2% and 5% of normal operating voltage, and (b) a frequency higher than a fundamental operating frequency to induce current without causing motor rotation.

According to an aspect of that second implementation of such a method, the frequency may be between 500 Hz and 1 kHz.

According to an instance of that aspect of the second implementation, when the electric motor has a number of phases greater than 1, applying, to each respective phase of the electric motor, a respective test voltage signal, may include applying a number of test voltage signals equal to the number of phases, and the test voltage signals may be uniformly separated by phase angle. In one variant of that instance, the number of phases may be 3, and the test voltage signals may be separated by phase angles of $2\pi/3$ radians.

According to a third implementation of such a method, the respective predetermined threshold may represent a noise level of the respective phase. One aspect of that third implementation may further include performing calibration to determine each respective predetermined threshold.

Apparatus according to implementations of the subject matter of this disclosure, for testing phases (e.g., phase windings, connections to phase windings, or related circuitry) of an electric motor prior to entering a RUN state, includes circuitry for applying to each respective phase of the electric motor a respective test voltage signal having parameters selected to avoid causing the motor to rotate, sensors for measuring in each respective phase a respective current induced by the respective test voltage signal, and a controller configured to enter the RUN state when values representative of all respective currents are above respective predetermined thresholds, and prevent entry into the RUN state when at least one value representative of a respective currents is below the respective predetermined threshold.

According to a first implementation of such apparatus, each respective test voltage signal may be below a voltage that would cause the electric motor to rotate.

According to a second implementation of such apparatus, the parameters of each respective test voltage signal may include (a) a magnitude between 2% and 5% of normal operating voltage, and (b) a frequency higher than a fundamental operating frequency to induce current without causing motor rotation.

According to an aspect of that second implementation, the frequency may be between 500 Hz and 1 kHz.

According to one instance of that aspect of the second implementation, the electric motor may have a number of phases greater than 1, the test voltage signal may include a number of test voltage signals equal to the number of phases, and the test voltage signals may be uniformly separated by phase angle. In one variant of that instance, the number of phases may be 3, and the test voltage signals may be separated by phase angles of $2\pi/3$ radians.

According to a third implementation of such apparatus, the respective predetermined threshold may represent a noise level of the respective phase.

According to a fourth implementation of such apparatus, the circuitry for applying to each respective phase of the electric motor a respective test voltage signal may include the controller.

According to a fifth implementation of such apparatus, the circuitry for applying, to each respective phase of the electric motor, a respective test voltage signal, may include a test signal generator separate from the controller.

An electric vehicle according to implementations of the subject matter of this disclosure includes an electric traction motor, a vehicle controller configured with a RUN state in which it accepts operator motor power commands and controls delivery of motor power according to the motor power commands, and apparatus for testing phases (e.g., phase windings, connections to phase windings, or other circuitry) of the electric traction motor upon vehicle startup, prior to entering the RUN state in which motor power commands are accepted from a driver. The apparatus includes circuitry for applying, to each respective phase of the electric traction motor, a respective test voltage signal, sensors for measuring in each respective phase a respective current induced by the respective test voltage signal, and control circuitry configured to enter the RUN state when each respective current is above a respective predetermined threshold, and prevent entry into the RUN state when at least one respective current is below the respective predetermined threshold.

According to one implementation of such a vehicle, the apparatus for testing may be incorporated in the vehicle controller. According to another implementation of such a vehicle, the circuitry for applying to each respective phase of the electric traction motor a respective test voltage signal may include test current command circuitry separate from the vehicle controller.

BRIEF DESCRIPTION OF THE DRAWINGS

Further features of the subject matter of this disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
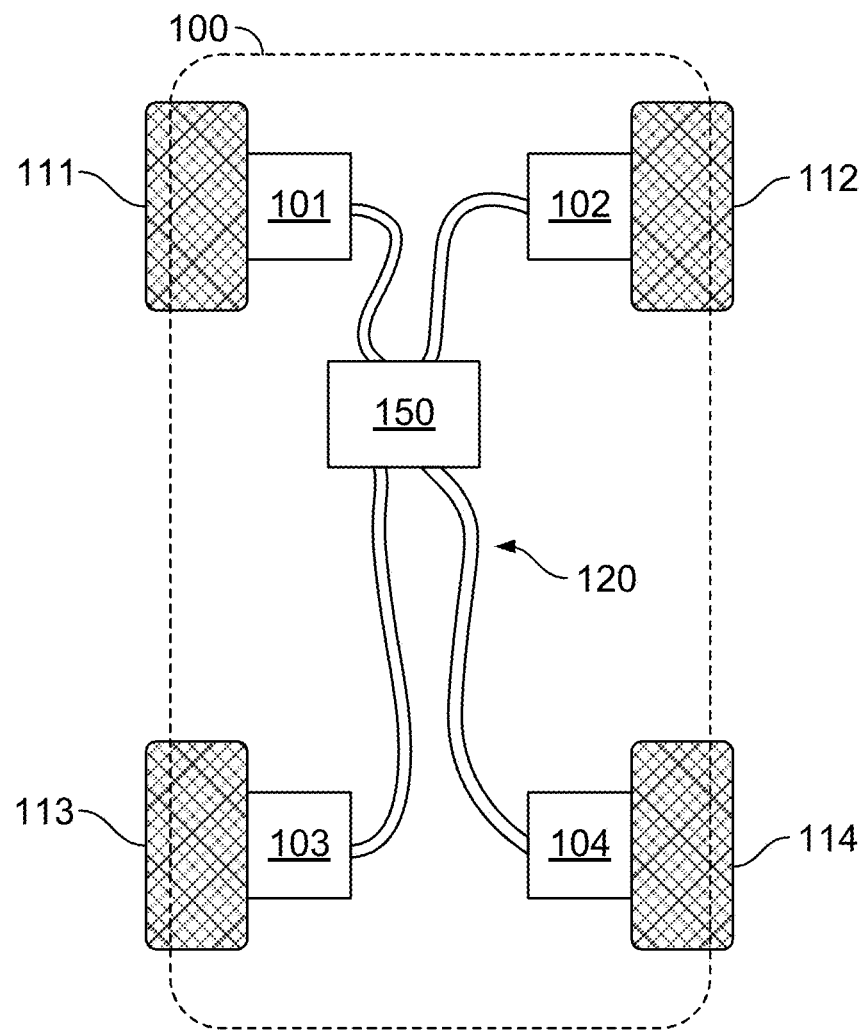
FIG. 1 is a diagram of illustrative vehicle incorporating implementations of the subject matter of this disclosure.

As noted above, attempting to operate an electric motor of a motorized device when the electric motor has a faulty motor phase can cause additional damage to the electric motor, the power electronics, or other components of the motorized device. If the motorized device is an electric vehicle, that could include damage to the vehicle drivetrain. If the flaw develops, or begins to develop, while the motorized device is in use and the electric motor is running, RUN-state diagnostic circuitry or software can notify the user to have the device serviced or, if the flaw is more serious, advise the user to stop the motorized device and switch off the electric motor as soon as it is safe to do so. In an extreme situation where keeping the motor in operation for even a short time would be dangerous, the faulty motor could be shut down immediately. If the motorized device is an electric vehicle, the faulty motor in the latter situation could be shut down even while the vehicle is in motion. For example, because in some vehicles each wheel is powered by a separate motor, the driver of such a vehicle would be able to safely bring the vehicle to a stop at a safe location using the power of the other motors.

If a user attempts to restart a motorized device in which a faulty motor phase was previously detected, starting of the motorized device can be prevented based on the earlier detection.

However, if a fault develops in a motor phase between uses (e.g., because of thermal cycling) and therefore was not previously detected, detection of the fault before the faulty electric motor begins to run would minimize further damage to the electric motor or other components of the motorized device. Therefore, in accordance with implementations of the subject matter of this disclosure, a method and apparatus are provided that can detect a fault in an electric motor phase (meaning, e.g., in the phase winding itself, in the power circuitry for the phase, or in a connector between the power circuitry and the electric motor) within the time it takes for a user to start the motorized device, and without occupying excessive computational resources in the device controller. In some implementations, diagnostics are performed without applying power at operational levels that could cause further damage and, if a fault is detected, starting of the electric motor can be prevented, as described in more detail below. In addition, in implementations, detection of the fault takes place within the time it takes for an operator to provide an input command to start the motor (e.g., press a "Start" button)—for example, 25 ms. In an electric vehicle application, this means that diagnostics and detection could be completed well within the time it takes for a driver to start the vehicle, without changing the vehicle driving experience.

In implementations of the subject matter of this disclosure, when a user of an electric motorized device attempts to start the device (for example, when the driver of an electric vehicle pushes a vehicle "Start" button), the device controller enters a "PRE-RUN" state or mode in which a high-frequency, low-voltage signal, as described in more detail below, is injected into each phase of the electric motor (i.e., into each phase winding, or into connections or other circuitry coupled to each phase winding). The resulting current in each phase is processed to determine an averaged or smoothed value (e.g., a mean-square value), and the device is allowed to start—i.e., the device controller is allowed to enter a "RUN" state or mode in which it accepts operator motor power commands and controls delivery of motor power according to the motor power commands (e.g., where the device is a vehicle, to propel the vehicle)—only if the averaged or smoothed values representative of the currents for all phases exceed respective predetermined noise thresholds. If the value representative of the averaged or smoothed current value for any phase is not detected or fails to exceed the predetermined noise threshold, then the device controller may be prevented from entering the "RUN" state or mode.

Because, in implementations, the motor phase testing occurs during the device starting process, without noticeably lengthening that process, then, assuming the system passes the test, the phase testing process does not cause any interference with device operation that is perceptible to the user. Moreover, if the system does not pass the motor phase testing process, further device damage, that might result from running the device with a faulty motor phase, is prevented.

Implementations of the subject matter of this disclosure may be instantiated using existing device control hardware. Alternatively, in other implementations, diagnostic hardware may be added to the device control system.

The subject matter of this disclosure may be better understood by reference to FIGS. 1-6, which illustrate implementations of the subject matter of this disclosure in an electric vehicle.

FIG. 1 is a diagram of an illustrative vehicle 100 having multiple electric motors, in accordance with implementations of the subject matter of the present disclosure. Each of motor assemblies 101, 102, 103 and 104 may include an electric motor, a gearbox (e.g., a reduction gearset or pulley set), a shaft coupling (e.g., to one of wheels 111-114), auxiliary systems (e.g., a lubricating oil system, a cooling system, a power electronics system), any other suitable components, or any combination thereof. As illustrated, each of motor assemblies 101-104 is coupled to control system 150 via couplings 120, which may include power leads, control wires, sensor wires, communications buses, any other suitable coupling types, or any combination thereof. For example, in some embodiments, control system 150 includes a battery pack or is otherwise coupled to a battery pack and is configured to provide electrical drive power (e.g., current) to electric motors of motor assemblies 101-104.

Control system 150 may be configured to generate torque commands for each of motor assemblies 101-104. In some implementations, control system 150 generates control signals for each of motor assemblies 101-104. The control signals may include messages, current values, pulse-width modulation (PWM) values, any other suitable values, any other information indicative of a desired operation, or any combination thereof. For example, control system 150 may include a speed controller (e.g., a proportional-integral-derivative (PID) feedback controller), a torque controller, a current controller (e.g., per motor phase of each motor), a position controller, any other suitable controllers, or any combination thereof.

Figure 2:
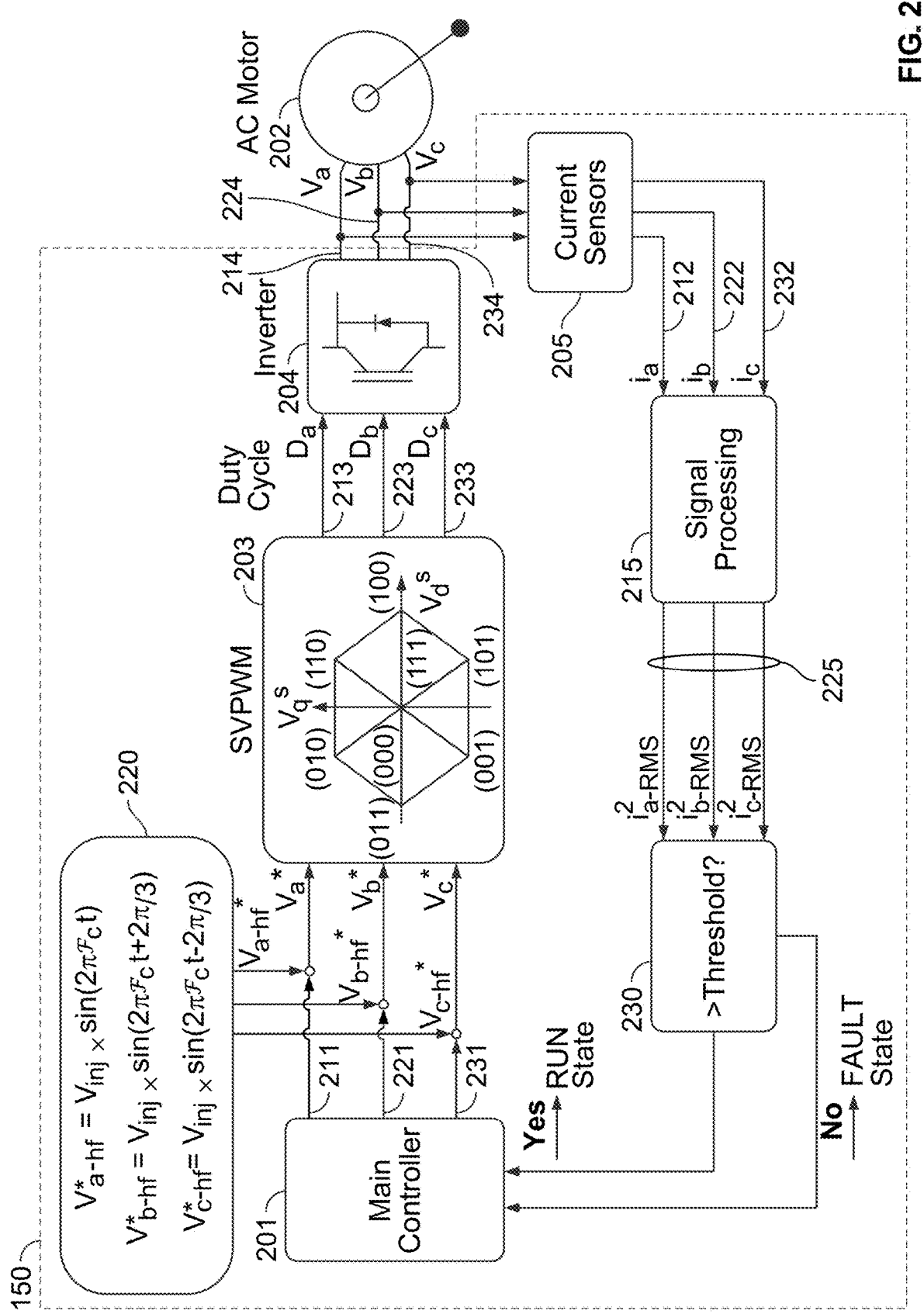
FIG. 2 is a diagram of illustrative vehicle control system according to implementations of the subject matter of this disclosure.

FIG. 2 shows details of an implementation of control system 150 as applied to one of motor assemblies 101-104, and configured to implement the subject matter of this disclosure. Main controller 201, which could be the main vehicle controller, or a could be a wheel controller in the particular one of assemblies 101-104, for controlling AC motor 202 in accordance with driver inputs (which may be entered, e.g., via accelerator and brake pedals). In normal operation in the "RUN" state, main controller 201 provides voltage command signals 211 ($V^*_a$), 221 ($V^*_b$) and 231 ($V^*_c$) (which may, e.g., be digital) to space vector pulse-width modulation (SVPWM) circuitry 203. SVPWM circuitry 203 outputs duty-cycle signals 213 ($D_a$), 223 ($D_b$) and 233 ($D_c$) to inverter 204. Inverter 204 outputs respective AC voltage signals 214 ($V_a$), 224 ($V_b$) and 234 ($V_c$) to the respective phases of AC motor 202 to achieve the desired motor torque and/or speed.

During the "RUN" state, sensors 205 may detect motor phase currents and output current-representative signals 212 ($i_a$), 222 ($i_b$) and 232 ($i_c$) induced the phase windings of AC motor 202 by AC voltage signals 214 ($V_a$), 224 ($V_b$) and 234 ($V_c$), and, in some implementations, also rotor position data, for RUN-state diagnostic purposes. Current may be detected by any suitable technique, including direct measurement of current, as well as by indirect measurement, such as the measurement of voltage across a known resistance or other impedance.

As discussed above, in accordance with implementations of the subject matter of this disclosure, a diagnostic procedure is carried out when a driver attempts to start a vehicle, before the vehicle enters the RUN state, to determine whether there is any phase fault (e.g., a phase connection fault). Implementations of a method in accordance with the subject matter of this disclosure may proceed as set forth in FIGS. 3 and 4, which are flow diagrams of such an implementation 300.

Method 300 begins at 301 with the vehicle in the "OFF" state. As a driver provides a "Start" input (e.g., by pressing a "Start" button or turning a key), the main vehicle controller (which at least in some implementations may be main controller 201) first enters a "STANDBY" state at 302, during which accessory power (e.g., 12V) is available. Other events that might initiate STANDBY state 302 could include unlocking of a door, the approach of the driver to within a certain distance from the vehicle (as determined, e.g., by the presence of a transponder or "fob"), or detection that someone is sitting in the driver's seat.

After further input is received, such as the driver continuing to press the "Start" button or turning the key, the main vehicle controller transitions at 303 to a "PRE-RUN" state during which phase connection diagnostic procedure 400 (FIG. 4) according to implementations of the subject matter of this disclosure may be carried out. The phase connection diagnostic procedure may also run at predetermined intervals when the vehicle is dormant. After phase connection diagnostic procedure 400, the main vehicle controller finally, at 304, enters a "RUN" state during which main control software is engaged to allow normal driving of vehicle 100.

Figure 4:
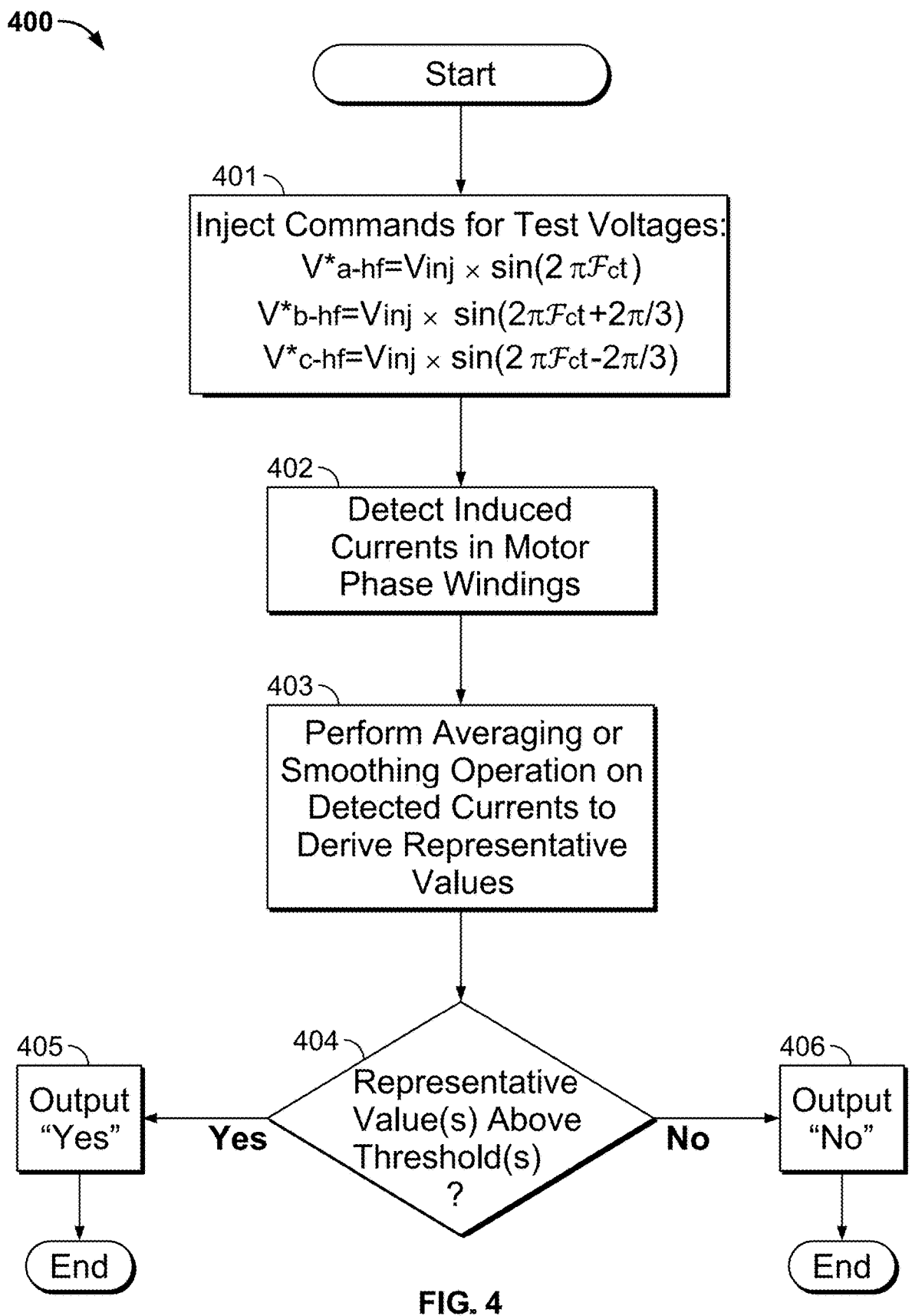
FIG. 4 is a flow diagram illustrating a portion of the method of FIG. 3 according to implementations of the subject matter of this disclosure.

During the PRE-RUN state at 303, the outputs of current sensors 205 are analyzed by phase connection diagnostic procedure 400 (FIG. 4). In some implementations, current sensors 205 will have first been calibrated at 313 to determine a noise threshold below which current output cannot be distinguished from system noise. Although not strictly part of PRE-RUN state 303, calibration 313 normally would be conducted each time the system is powered up, to remove DC offset from current sensors 205, and therefore it is shown as part of PRE-RUN state 303. In other implementations, calibration 313 can be conducted periodically, such as according to a predetermined schedule. In still other implementations, calibration 313 is not conducted on current sensors 205, and a noise threshold is instead determined based on default values or known characteristics of the current sensors 205.

As seen in FIG. 4, phase connection diagnostic procedure 400 begins at 401, where commands to SVPWM circuitry 203 and inverter 204 to generate three low-voltage/high-frequency test voltages:

$$V^*_{a-hf} = V_{inj} \times \sin(2\pi F_c t)$$

$$V^*_{b-hf} = V_{inj} \times \sin(2\pi F_c t + 2\pi/3)$$

$$V^*_{c-hf} = V_{inj} \times \sin(2\pi F_c t - 2\pi/3)$$

are injected at 220 into the command inputs 211, 221, 231 for the three phases (indicated by the subscripts a, b and c). In this context "low-voltage" means a voltage $V_{inj}$ that is too low to cause rotation of motor 202, such that in case there is a phase connection fault, further damage to motor 202 (or to other vehicle components) does not occur as a result of rotation initiated by diagnostic procedure 400. In some implementations, the test voltage $V_{inj}$=15 V, but $V_{inj}$ may have any value, for example and without limitation, between 2% and 5% of normal electric vehicle motor operating voltage (e.g., operating voltages between 200 V and 800 V as in the examples discussed). Similarly, in this context, "high-frequency" means a frequency high enough to excite the inductive part of the motor impedance, to induce a small amount of current. The frequency also is selected to be higher than the frequency of the fundamental signal so that the motor will not rotate or vibrate. In some implementations, the frequency $\mathcal{F}_c$ is between 500 Hz and 1 kHz. As seen, the three voltage components—one for each motor phase winding—are evenly separated by $$2\pi/3$$

radians, or 120°, of phase. More generally, for n phases, the test voltage components should be separated by $$2\pi/n$$

radians of phase.

In some implementations, the commands to generate the test voltages are injected by separate test voltage command circuitry 220, as shown. In other implementations (not shown), the commands to generate the test voltages can be injected by main controller 201 itself (which can be part of the normal vehicle control system).

As noted above, test voltages commanded at 220 are selected to avoid causing rotation of AC motor 202. However, the test voltages commanded at 220 are configured to induce AC currents in the phase windings of AC motor 202, even during diagnostic procedure 400. At 402, current sensor 205 detects those AC currents and outputs current-representative signals 212 ($i_a$), 222 ($i_b$) and 232 ($i_c$).

In some implementations, instantaneous values of current-representative signals 212 ($i_a$), 222 ($i_b$) and 232 ($i_c$) are further processed to determine whether any motor phase fault exists. In other implementations, current-representative signals 212 ($i_a$), 222 ($i_b$) and 232 ($i_c$) are averaged or smoothed at 403 to yield a constant or near-constant representative value that can be compared at 404 to a threshold.

In some implementations, averaging or smoothing operation 403 may be performed by main controller 201, or by signal processing circuitry 215 provided for that purpose. Values are derived from current-representative signals 212, 222, 232 by averaging or smoothing operation 403. Those derived values may be actual current values (e.g., root-mean-square, or RMS, current values), or may be other values representative of the current values, such as mean-square currents (i.e., the squares of the RMS currents) $i_{a\text{-}RMS}^2$, $i_{b\text{-}RMS}^2$, $$i_{a\text{-}RMS}^2 = \frac{\sum_{k=1}^{N} i_{a\text{-}hf}^2(k)}{N}$$

$$i_{b\text{-}RMS}^2 = \frac{\sum_{k=1}^{N} i_{b\text{-}hf}^2(k)}{N}$$

$$i_{c\text{-}RMS}^2 = \frac{\sum_{k=1}^{N} i_{c\text{-}hf}^2(k)}{N}$$

$i_{c\text{-}RMS}^2$ (225):
that are related to the magnitudes of current-representative signals 212, 222, 232, where $$i_{a\text{-}hf} = \frac{V_{a\text{-}hf}^*}{Z_a} \approx \frac{V_{a\text{-}hf}^*}{L_a}$$

$$i_{b\text{-}hf} = \frac{V_{b\text{-}hf}^*}{Z_b} \approx \frac{V_{b\text{-}hf}^*}{L_b}$$

$$i_{c\text{-}hf} = \frac{V_{c\text{-}hf}^*}{Z_c} \approx \frac{V_{c\text{-}hf}^*}{L_c}$$

and where $Z_a$, $Z_b$ and $Z_c$ are the respective impedances of the respective motor phases, and $L_a$, $L_b$ and $L_c$ are the respective inductances of the respective motor phases.

Comparison operation 404 may be performed by main controller 201, or by comparator circuitry 230 provided for that purpose. The comparison operation 404 may compare each one of representative current values 225 to a threshold. The threshold, which may be 0 in an ideal noiseless system, may be the noise threshold, found during calibration operation 313, below which current output cannot be distinguished from system noise. A separate such noise threshold may be determined for each phase, or a single noise threshold may be determined. If a single noise threshold is used, the single noise threshold may be derived by determining a separate noise threshold for each phase, and selecting the highest threshold as the single threshold, recognizing that false detection of a faulty phase may occur if the representative value of detected current on a phase with a lower actual threshold has a magnitude between the lower actual threshold and the selected threshold. Thus, a single-threshold technique might be utilized where all of the actual thresholds are close to one another.

Figure 3:
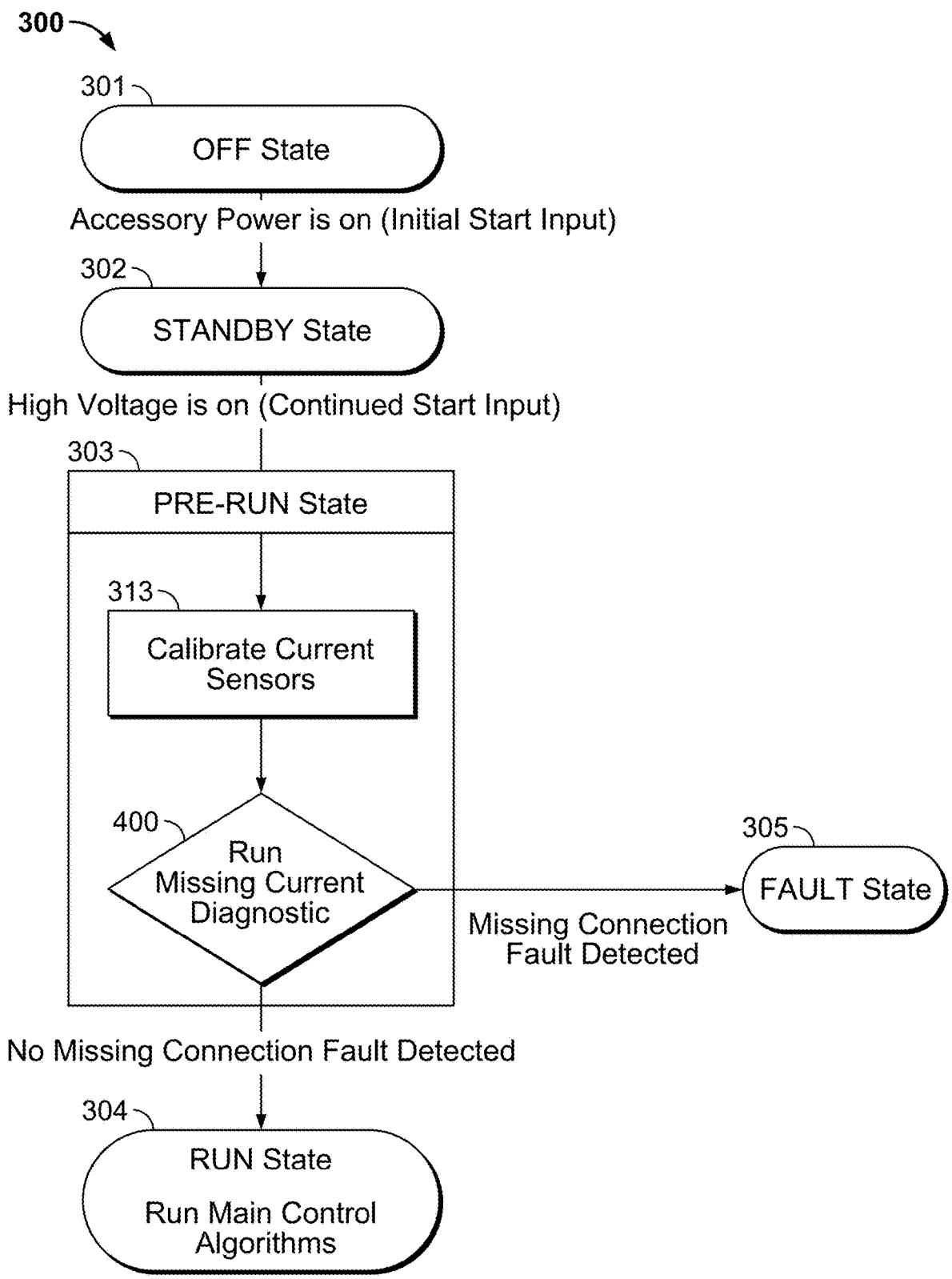
FIG. 3 is a flow diagram illustrating a method according to implementations of the subject matter of this disclosure.
Figure 5:
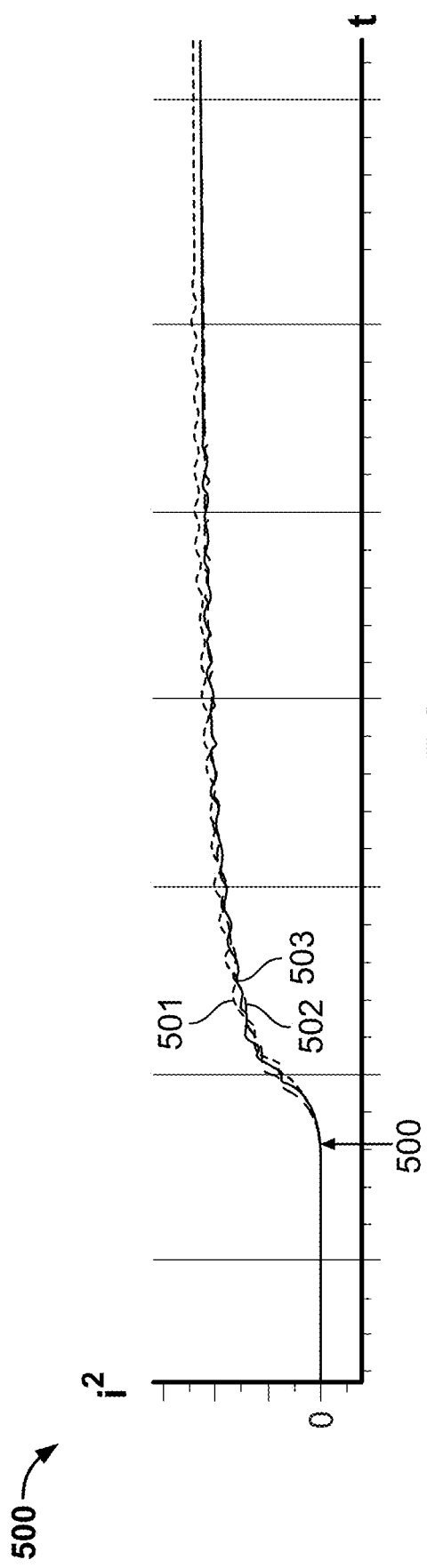
FIG. 5 is a graphical representation of signals indicating motor phase currents in the absence of phase faults.

In a single-threshold implementation, if, at comparison 404, all of the detected averaged or smoothed representative current values 225 are above the single value selected as the threshold for all phases, then diagnostic procedure 400 outputs a "YES" at 405 and flow proceeds to "RUN" state 304 (FIG. 3). Such a situation is shown in FIG. 5, which is a plot of the representative values 501, 502, 503 of currents in three phases, as a function of time. As can be seen, all values 501, 502, 503 are above the threshold, indicated on the ordinate as "0," from the time 500 that diagnostic procedure 400 begins. In the situation represented in FIG. 5, while the three values 501, 502, 503 are not identical, they are all close to each other. The relative values of the three values 501, 502, 503 may be a function of the angular position of the motor rotor relative to the magnets in the motor stator at the time of measurement. In some rotor positions, the three values 501, 502, 503 may not all be as close to each other as in FIG. 5.

Figure 6:
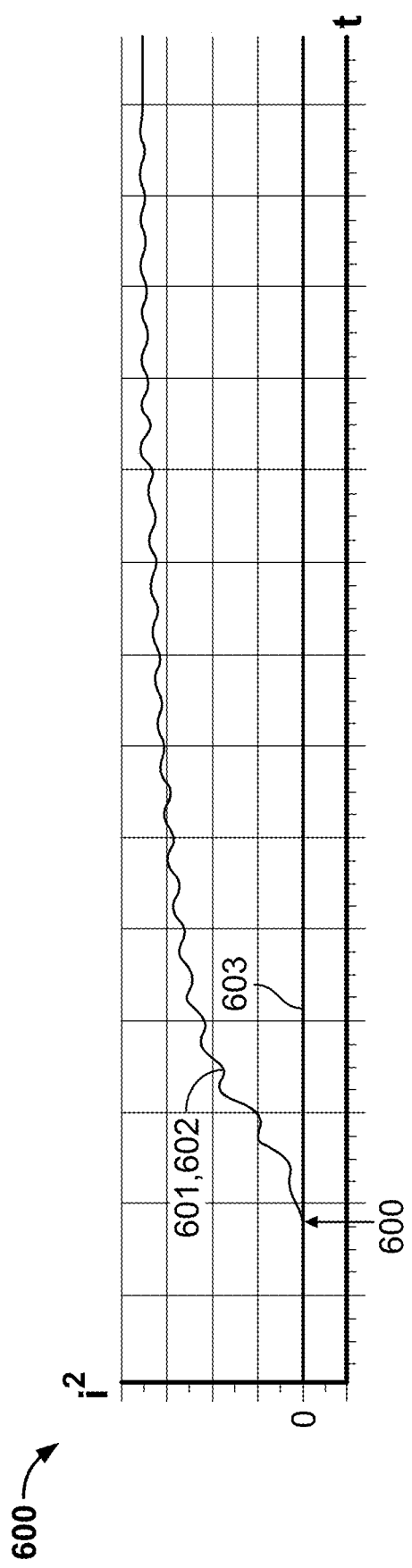
FIG. 6 is a graphical representation of signals indicating motor phase currents in a situation where there is a fault in one phase.

If any of the detected averaged or smoothed representative current values 225 is below the single threshold at comparison 404, then diagnostic procedure 400 outputs a "NO" at 406 and flow proceeds to FAULT state 305 (FIG. 3) in which the vehicle is prevented from running, and in which appropriate warnings or instructions may be displayed (not shown) to the driver, thereby preventing further damage to vehicle 100 that could result from operating with a faulty phase. Such a situation is shown in FIG. 6, which is a plot of the representative values 601, 602, 603 of currents in three phases, as a function of time. As can be seen, in this case, values 601 and 602 are above the threshold, indicated on the ordinate as "0," from the time 600 that diagnostic procedure 400 begins, but representative value 603 does not exceed the threshold (value 603 may be at the threshold, or may be at a value that is below the threshold and therefore is not detectable). As described above in connection with FIG. 5, in the situation represented in FIG. 6, the relative values of the three values 601, 602, 603 may be a function of the angular position of the motor rotor relative to the magnets in the motor stator at the time of measurement. In the example shown, the two values 601, 602 that are detectable are nearly identical.

In an implementation (not shown) in which separate noise thresholds are determined for each phase, then if each of the detected averaged or smoothed representative current values 225 is above its respective calibrated threshold at comparison 404, then diagnostic procedure 400 outputs a "YES" at 405 and flow proceeds to "RUN" state 304 (FIG. 3). But if any of the detected averaged or smoothed representative current values 225 is below its respective calibrated threshold at comparison 404, then diagnostic procedure 400 outputs a "NO" at 406 and flow proceeds to FAULT state 305 (FIG. 3) in which the vehicle is prevented from running, and in which appropriate warnings or instructions may be displayed (not shown) to the driver, thereby preventing further damage to vehicle 100 that could result from operating with a faulty phase.

The implementations illustrated in FIGS. 1-6 relate to an electric vehicle, which may include a car (e.g., a coupe, a sedan, a truck, an SUV, a bus), a motorcycle, an aircraft (e.g., a drone), a watercraft (e.g., a boat), or any other type of vehicle. The subject matter of this disclosure also may be implemented in other types of electric motorized devices, such as construction equipment or tool.

Thus it is seen that method and apparatus for diagnosing motor phase connections, particularly in an electric vehicle, have been provided. More particularly, diagnostics for motor phase connections between an inverter and an electric motor in an electric motorized device, which operate without risk of damaging device systems and without interfering with device operation, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for testing phases of an electric motor upon startup, the method comprising:
   prior to entering a RUN state, applying to each respective phase of the electric motor a respective test voltage signal, each respective test voltage signal having parameters selected to avoid causing the electric motor to rotate;
   measuring in each respective phase a respective current induced by the respective test voltage signal; and
   preventing entry into the RUN state when at least one value representative of a respective current is below the respective predetermined threshold.

2. The method of claim 1 further comprising allowing entry into the RUN state when each value representative of a respective current is above the respective predetermined threshold.

3. The method of claim 1 wherein the selected parameters of each respective test voltage signal include (a) a magnitude between 2% and 5% of normal operating voltage, and (b) a frequency higher than a fundamental operating frequency to induce current without causing motor rotation.

4. The method of claim 3 wherein the frequency is between 500 Hz and 1 kHz.

5. The method of claim 4 wherein:
   when the electric motor has a number of phases greater than 1, applying to each respective phase of the electric motor a respective test voltage signal comprises applying a number of test voltage signals equal to the number of phases; and
   the test voltage signals are uniformly separated by phase angle.

6. The method of claim 5 wherein:
   the number of phases is 3; and
   the test voltage signals are separated by phase angles of $2\pi/3$ radians.

7. The method of claim 1 wherein the respective predetermined threshold represents a noise level of the respective phase.

8. The method of claim 7 further comprising performing calibration to determine each respective predetermined threshold.

9. Apparatus for testing phases of an electric motor, prior to entering a RUN state, the apparatus comprising:
   circuitry for applying to each respective phase of the electric motor a respective test voltage signal, each respective test voltage signal having parameters selected to avoid causing the electric motor to rotate;
   sensors for measuring in each respective phase a respective current induced by the respective test voltage signal; and
   a controller configured to prevent entry into the RUN state when at least one value representative of a respective current is below the respective predetermined threshold.

10. The apparatus of claim 9 wherein the controller is further configured to allow entry into the RUN state when each value representative of a respective current is above the respective predetermined threshold.

11. The apparatus of claim 9 wherein the parameters of each respective test voltage signal include (a) a magnitude between 2% and 5% of normal operating voltage, and (b) a frequency higher than a fundamental operating frequency to induce current without causing motor rotation.

12. The apparatus of claim 11 wherein the frequency is between 500 Hz and 1 kHz.

13. The apparatus of claim 12 wherein:
   the electric motor has a number of phases greater than 1;
   the test voltage signal comprises a number of test voltage signals equal to the number of phases; and
   the test voltage signals are uniformly separated by phase angle.

14. The apparatus of claim 13 wherein:
   the number of phases is 3; and
   the test voltage signals are separated by phase angles of $2\pi/3$ radians.

15. The apparatus of claim 9 wherein the respective predetermined threshold represents a noise level of the respective phase.

16. The apparatus of claim 9 wherein the circuitry for applying to each respective phase of the electric motor a respective test voltage signal comprises the controller.

17. The apparatus of claim 9 wherein the circuitry for applying to each respective phase of the electric motor a respective test voltage signal comprises a test signal generator separate from the controller.

18. An electric vehicle comprising:
   an electric traction motor;
   a vehicle controller configured with a RUN state in which it accepts operator motor power commands and controls delivery of motor power according to the motor power commands; and
   apparatus for testing phases of the electric traction motor upon vehicle startup, prior to entering the RUN state in which motor power commands are accepted from a driver to propel the electric vehicle, the apparatus comprising:
      circuitry for applying to each respective phase of the electric traction motor a respective test voltage signal, sensors for measuring in each respective phase a respective current induced by the respective test voltage signal, and control circuitry configured to prevent entry into the RUN state when at least one value representative of a respective current is below the respective predetermined threshold.

19. The vehicle of claim 18 wherein the apparatus for testing is incorporated in the vehicle controller.

20. The vehicle of claim 18 wherein the circuitry for applying to each respective phase of the electric traction motor a respective test voltage signal comprises test current command circuitry separate from the vehicle controller.

\* \* \* \* \*